United States Patent [19]
Watson, Jr.

[11] 4,264,752
[45] Apr. 28, 1981

[54] RADIATION-CURABLE ACRYLATED URETHANE POLYCARBONATE COMPOSITIONS

[75] Inventor: Stuart L. Watson, Jr., South Charleston, W. Va.

[73] Assignee: Union Carbide Corporation, New York, N.Y.

[21] Appl. No.: 64,398

[22] Filed: Aug. 8, 1979

[51] Int. Cl.$^3$ .............................................. C08G 18/44
[52] U.S. Cl. ...................................... 525/467; 528/49; 528/75; 528/370; 528/371
[58] Field of Search .................. 525/467; 528/49, 370, 528/371, 75

[56] References Cited

U.S. PATENT DOCUMENTS

| | | |
|---|---|---|
| Re. 29,131 | 2/1977 | Smith et al. .................... 204/159.14 |
| 3,444,141 | 5/1969 | Shima ................................. 525/437 |
| 3,637,909 | 1/1972 | von Bonin et al. ................. 525/467 |
| 3,764,457 | 10/1973 | Chang et al. ........................ 525/467 |
| 4,131,731 | 12/1978 | Lai et al. ............................ 525/467 |
| 4,150,211 | 4/1979 | Müller et al. ....................... 525/467 |

OTHER PUBLICATIONS

Sukhov et al., *J. App. Chem. USSR*, (Eng) 50, 1977, pp. 333–337.

*Primary Examiner*—Maurice J. Welsh
*Attorney, Agent, or Firm*—Stanley Ktorides

[57] ABSTRACT

Acrylated urethane polycarbonate compositions are formed from the reaction of a polycarbonate polyol, a polyisocyanate and a hydroxy-containing acrylate monomer. These compositions are useful as components of improved radiation-curable compositions.

4 Claims, No Drawings

RADIATION-CURABLE ACRYLATED URETHANE POLYCARBONATE COMPOSITIONS

BACKGROUND OF THE INVENTION

Coatings play a useful role in the manufacture of a great many articles which find wide use in nearly all facets of contemporary life. Until recently, nearly all coatings were applied with the employment of an organic solvent vehicle which evaporated leaving the dried coating on the article which was to be coated. This system met with increasing disfavor as the price of organic solvents increased and as the deleterious environmental effects of the evaporated solvent became better understood. Systems aimed at solvent recovery to reduce pollution and conserve solvent have generally proven to be expensive and energy intensive. In response, those skilled in the art have devised a class of coatings termed radiation-curable coatings in which, upon exposure of radiation, virtually all of the liquid portion of the coating is converted to cured coating, resulting in little solvent emission.

Unfortunately the radiation-curable coatings that have heretofore been developed have not exhibited the tensile strength of some solvent-based coatings. For example, comparison of a typical radiation-curable acrylated urethane with a conventional solvent-based moisture-curable urethane coating usually shows the conventional system to have a significantly greater tensile strength. A radiation-curable composition which when cured exhibits greater tensile strength than comparable coatings would be of great advantage.

SUMMARY OF THE INVENTION

It has now been found that compositions formed from the reaction of a polycarbonate polyol, a polyisocyanate and a hydroxy-containing acrylate monomer, can be used in radiation-curable coatings and that the resulting cured coatings exhibit significantly greater tensile strength than comparable coatings.

DESCRIPTION OF THE INVENTION

The acrylated urethane carbonate compositions of this invention are defined by the general formula

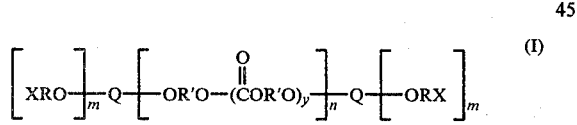

wherein O is oxygen and C is carbon; X is acryloyloxy; R is alkylene of from 1 to 20 carbon atoms, preferably from 2 to 6 carbon atoms; Q is the residue of an organic polyisocyanate, preferably a diisocyanate; R' is the residue of an alkylene diol or a polyoxyalkylene diol having 2 to 10 carbon atoms in the alkylene group and a molecular weight of from 28 to 230; and the sum of m and n is equal to the total reactive equivalents of the Q groups.

The novel acrylated urethane carbonate compositions of this invention are formed from the reaction of a polycarbonate polyol, a polyisocyanate and a hydroxyl functional acrylate ester.

The polycarbonate polyols useful in the formation of the compositions of this invention are known compounds; they are the reaction products of a polyol and an organic carbonate compound or phosgene. In their production one can use an alkylene glycol or a poly(oxyalkylene glycol) of the general formula $HO(R'O)_xH$ wherein R' is alkylene having 2 to 10 carbon atoms and x is an integer such that the molecular weight is from 28 to 140, such as 1,4-butanediol, 1,6-hexanediol, diethylene glycol, ethylene glycol, triethylene glycol, 1,2-propylene glycol, 1,3-propylene glycol, dipropylene glycol, hexylene glycol, 2-ethyl-1,3-hexanediol, 1,5-pentanediol, 1,4-cyclohexanediol, glycerol, 1,2,6-hexanetriol, polyoxyethylene glycols and triols, polyoxypropylene glycols and triols and the like.

The organic carbonates which can be used to produce the polycarbonate polyols are also known and are of the general formula

wherein R" is arylene having from 6 to 10 ring carbon atoms or alkyl having from 1 to 6 carbon atoms. Illustrative thereof one can name diphenyl carbonate, ditolyl carbonate, dimethyl carbonate, diethyl carbonate and the like. Additionally, the reaction of phosgene with polyols to form polycarbonates is well established.

The organic polyisocyanates useful are the known aliphatic and aromatic isocyanates having from 2 to 6 isocyanato groups in the molecule. The preferred are the diisocyanates. In general formula I, the symbol Q represents the residue of the organic polyisocyanate after it has reacted with the reactive hydroxyl groups of the other reactants and the isocyanato groups have been converted to urethane linkages. It is known that the urethane linkages have the structure

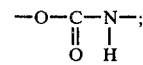

thus the term "residue of the organic polyisocyanate" represents the polyisocyanate reacted to the urethane derivative. If one represents a polyisocyanate by the formula OCNQNCO, then the residue thereof is

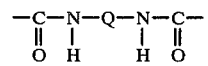

Illustrative of suitable organic polyisocyanates one can mention octadecyl isocyanate, 3,5,5-trimethyl-1-isocyanato-3-isocyanatomethyl-cyclohexane, di(2-isocyanatoethyl)-bicyclo-[2.2.1]-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-tri-isocyanate toluene, 4,4'4"-triisocyanate triphenyl methane, diphenylene-4,4-diisocyanate, and polymethylene polyphenylisocyanates, as well as any of the other organic isocyanates known to the average skilled chemist. Of course, mixtures of isocyanates can be used.

The hydroxyl functional acrylate esters are well known, and many of them are commercially available. They can be represented by the general formula XROH wherein X and R have the meanings hereinbefore indicated. Illustrative thereof one can mention 2-hydroxyethyl acrylate, 2-hydroxypropyl acrylate, hydroxypentyl acrylate and the like.

The acrylated urethane carbonate compositions of this invention are produced by reacting under anhydrous conditions at from 0° C. to 100° C., preferably from 0° C. to 60° C. The reaction is carried out at subatmospheric, atmospheric, or superatmospheric pressure; the preferred pressure is atmospheric. The reaction time will vary according to the size of the batch, the temperature and pressure employed and the particular carbonate polyol, polyisocyanate and hydroxy-functional acrylate compounds employed.

The acrylated urethane carbonates of formula (I) can be produced by several procedures. For example one can react all the reactants simultaneously by premixing the hydroxyl functional acrylate ester and diol and adding the polyisocyanate thereto, in which case one has a one step reaction. Preferably the desired products are produced in a step-wise reaction whereby the polycarbonate polyol is initially reacted with an excess of the polyisocyanate to produce an isocyanato terminated prepolymer and this prepolymer is subsequently reacted with the hydroxyl functional acrylate ester. In either instance the number of isocyanato groups reacted is equal to the total number of reactive hydroxyl groups present in the polycarbonate polyol and the hydroxyl functional acrylate ester. Generally, the accepted procedure in producing the isocyanato terminated prepolymers is to use a slight excess of the isocyanate, ranging up to about a ten percent excess thereof. The urethane reaction is preferably carried out in the presence of any of the known catalysts at the conventional concentrations thereof; illustrative catalysts are stannous octoate, dibutyl tin dilaurate, dioctyl tin diacetate, triethylene amine, morpholine etc.

In the typical step-wise procedure a polycarbonate polyol is initially reacted with at least one mole equivalent of an organic polyisocyanate to produce an isocyanato terminated prepolymer. This prepolymer is then reacted with the hydroxyl functional acrylate ester to produce the desired acrylated urethane polycarbonate compositions of this invention.

The acrylated urethane polycarbonate compositions of this invention can be used as coating compositions either alone or in admixture with conventional solvents, pigments, fillers and other additives. They can be applied by conventional means and cured by exposure to ultraviolet light or to high energy radiation such as gamma-ray, alpha-particle, beta-particle and accelerated electrons. If ultraviolet light is employed the coating composition preferably contains a photoinitiator. Illustrative of such photoinitiators one can name α,α-di-sec-butoxyacetophenone, benzophenone, p-methoxybenzophenone, acetophenone, m-chloro- actophenone, propiophenone, xanthone, benzoin, benzil,benzaldehyde, naphthoquinone, anthraquinone, di-t-butyl peroxide, dicumyl peroxide, t-butyl hydroperoxide, t-butyl-peracetate, peracetic acid, perbenzoic acid, benzoyl peroxide, dichlorobenzoyl peroxide, azobis-(isobutyronitrile), dimethyl azobis (isobutyrate), and the like. The photoinitiators may be used singly or in mixtures and are present in a concentration of from 0 to 10 weight percent, preferably from 0.1 to 1.5 weight percent based on the weight of the acrylated urethane polycarbonate.

The coatings can be applied by conventional means including spray, curtain, dip, pad, roll-coating and brushing procedures. The coatings can be applied to any acceptable substrate such as wood, metal, glass, fabric, paper, fibers, plastic that is any form, e.g. sheet, coil, molded, film, panel, tube, etc.

It was completely unexpected and unobvious to find that the acrylated urethane polycarbonates of this invention could be used to produce radiation-curable compositions and that such compositions when cured had tensile strengths several times greater than the comparable radiation-curable compositions which employ previously known compositions.

Experiments A, B and C were conducted for comparative purposes to show the tensile strengths of known acrylated urethane radiation-curable compositions.

Experiment A

There were charged to an amber bottle 22.0 grams of a polycaprolactone polyol having a number average molecular weight of 530, 5 drops of dibutyl tin dilaurate as catalyst, 21.4 grams of 2-(N-methylcarbamoyloxy)ethyl acrylate, 18.4 grams of isophorone diisocyanate and 9.6 grams of 2-hydroxyethyl acrylate. The reactants were mixed, the bottle capped and the mixture heated at 50° C. for about 16 hours. Thereafter 0.7 gram of α,α-di-sec-butoxyacetophenone as a photoinitiator was stirred in and the solution was applied to a silicone coated release paper and cured by exposure to ultraviolet light under a nitrogen atmosphere. The liquid coating cured to a solid film and was removed from the release paper.

The film was placed in a constant temperature/humidity room overnight. The next day a strip 0.25 inches wide was cut and placed in a 1.0 inch gauge length crosshead of a stress strain testing machine. The film strip was stretched to breakage and the force at failure was used, along with the width and thickness, to calculate the force per unit area at failure. The ultimate elongation was calculated using the formula $$\text{Ultimate Elongation \%} \left( = \frac{L}{L_o} - 1 \right) 100$$

where L is the length at failure and $L_o$ is the original gauge length. The film was found to have a tensile strength (ASTM D-2370-68) of 1800 psi and an ultimate elongation of 81 percent.

Experiment B

There were charged to an amber bottle 32.5 grams of a polycaprolactone polyol having a number average molecular weight of 1250, 5 drops of dibutyl tin dilaurate as catalyst, 21.4 grams of 2-(N-methylcarbomyloxy)ethyl acrylate, 11.5 grams of isophorone diisocyanate and 6.0 grams of 2-hydroxyethyl acrylate. The reactants were mixed, the bottle capped and the mixture was heated at about 50° C. for about 16 hours. Thereafter 0.7 grams of the same photoinitiator as that used in Experiment A was added and the solution was applied to release paper, cured and tested using procedures similar to those described in Experiment A. The film had a tensile strength of 510 psi and an ultimate elongation of 90 percent.

Experiment C

There were charged to a 500 ml round bottom flask equipped with a heating mantle, magnetic stirrer, condenser and dropping funnel 106 grams of a polycaprolactone polyol having a number average molecular weight of 530 and 300 ml of dichloromethane. To the dropping funnel there was charged 72 grams of acryloyl chloride which was then added dropwise to the flask with stirring. The resulting solution was refluxed for about 72 hours and then cooled to room temperature. The solution was washed repeatedly with distilled water and then dried over magnesium sulfate. The solvent was removed by rotary evaporation yielding the residue product.

To 10 grams of this residue product there was added 0.1 gram of the same photoinitiator as was used in Experiment A. The solution was applied to release paper, cured and tested using procedures similar to those described in Experiment A. The film had a tensile strength of 290 psi and an ultimate elongation of 11 percent.

The following examples serve to further illustrate the invention.

EXAMPLE 1

Part A

There were charged to a 250 ml three neck round bottom flask equipped with a thermometer, distilling column, heating mantle, magnetic stirrer, distilling head, air condenser, receiver and vacuum attachments, 45 grams of 1,4-butanediol, 85.6 grams of diphenyl carbonate and 0.1 gram of sodium hydroxide. The flask was evacuated to a pressure of about 10 mm Hg and the mixture was stirred and heated to about 100° C. and kept at these conditions for about three hours during which slow phenol distillation was observed. After three hours the pressure was reduced to 1 mm Hg and the temperature raised to 120° C. for 1 hour to complete the phenol distillation. After 1 hour the residue was cooled to room temperature and acetic acid was added dropwise until the mixture was neutralized. A distillate of 75.5 grams of phenol and a residue of 53.2 grams of a polymeric carbonate diol having a number average molecular weight of 554 was recovered. In polycarbonate had the structure, which was confirmed by IR, of the following general formula:

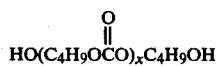

Sixteen grams of the above polymeric polycarbonate diol were charged to an amber bottle with 2 drops of dibutyl tin dilaurate as a catalyst, 14.1 grams of 2-(N-methylcarbamoyloxy)ethyl acrylate as solvent, 11.1 grams of isophorone diisocyanate and 5.8 grams of 2-hydroxyethyl acrylate. The reactants were then mixed well, the bottle capped and the mixture was heated at about 50° C. for about 16 hours. Thereafter was added 0.5 gram of α,α-di-sec-butoxyacetophenone as a photoinitiator and the resulting mixture was stirred. The solution was applied to release paper and cured by the procedure described in Experiment A. The liquid coating cured to a solid film and was removed from the release paper.

The film was placed in a constant temperature/humidity room overnight and evaluated as described in Experiment A. The film was found to have a tensile strength of 5100 psi and an ultimate elongation of 93 percent indicating a tensile strength increase by a factor of 2.83 over that of the known comparable coating of Experiment A.

Part B

For further comparative purposes, a film composed of a known acrylated carbonate was manufactured. There were charged to a 1 liter four neck round bottom flask equipped with a thermometer, mechanical stirrer, dropping funnel, condenser and heating mantle, 30 grams of the polycarbonate diol produce in Part A of this example and 200 ml of chloroform. From the dropping funnel 19.8 grams of acryloyl chloride was then added, dropwise, with stirring. After addition was complete the resulting solution was refluxed for about four hours and then cooled to room temperature. A solution of 25 grams of sodium carbonate in 300 ml of distilled water was added and the mixture was stirred for about 16 hours. The mixture was transferred to a separatory funnel, the organic layer was withdrawn, it was dried over magnesium sulfate and the solvent was removed by rotary evaporation. Using the same procedure as used in Part A, 1 weight percent of the same photoinitiator was added and the solution was coated on release paper, cured and tested; tensile strength of this cured coating was only 220 psi and ultimate elongation only 10 percent.

EXAMPLE 2

Part A

There were charged to the three neck flask described in Example 1, 42.4 grams of diethylene glycol, 64.2 grams of diphenyl carbonate and 0.1 gram of sodium hydroxide. The mixture was reacted following the procedure described in Example 1 except that the temperature during the fourth hour was only 110° C. A distillate of 56.1 grams of phenol and a residue of 50.2 grams of a polymeric carbonate diol having a number average molecular weight of 502 were recovered. The polycarbonate diol had the structure, which was confirmed by IR, of the following general formula:

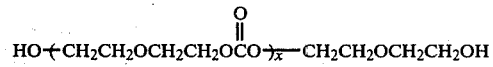

To an amber bottle there were charged 26.9 grams of the above polymeric polycarbonate diol, 5 drops of dibutyl tin dilaurate as catalyst, 26 grams of 2-(N-methylcarbamoyloxy)ethyl acrylate, 22.2 grams of isophorone diisocyanate and 11.6 grams of 2-hydroxyethyl acrylate. The reactants were mixed, the bottle capped and the mixture heated at about 60° C. for about 16 hours. Thereafter 0.9 gram of the same photoinitiator employed in Example 1 was mixed in and the solution was applied to release paper, cured and tested using a procedure similar to that described in Example 1. The film had a tensile strength of 6600 psi and an ultimate elongation of 50 percent. The tensile strength was 3.67 times greater than the tensile strength of the known comparable radiation-curable coating of Experiment A.

Part B

For further comparative purposes, a film composed of a known acrylated carbonate was manufactured. There were charged to the four neck flask, described in Example 1, 19.2 grams of the same polymeric polycarbonate diol produced in Part A of this example and 128 ml of chloroform. From the dropping funnel 14.1 grams of acryloyl chloride was then added, dropwise, with stirring. The resulting solution was refluxed for about four hours and then cooled to room temperature. A solution of 16 grams of sodium carbonate in 200 ml of distilled water was added and the mixture was stirred for about 16 hours. The separation was carried out following the procedure described in Example 1, Part B, 0.2 gram of the same photoinitiator was added to the organic layer and the solution was coated on release paper, cured and tested; tensile strength of the cured coating was only 240 psi and ultimate elongation only 12 percent.

EXAMPLE 3

There were charged to the three neck flask described in Example 1, 49.5 grams of 1,4 butanediol, 107 grams of diphenyl carbonate and 0.1 gram of sodium hydroxide. The mixture was reacted following the procedure described in Example 2. A distillate of 43.9 grams of phenol and a residue of 28.4 grams of a polymeric carbonate diol having a number average molecular weight of 1250 were recovered. The polycarbonate diol had the general structure shown in Example 1.

To an amber bottle there were charged 20 grams of the above polymeric polycarbonate diol, 2 drops of dibutyl tin dilaurate as catalyst, 13.3 grams of 2-(N-methylcarbamoyloxy)ethyl acrylate, 7.1 grams of isophorone diisocyanate and 4 grams of 2-hydroxyethyl acrylate. The reactants were mixed, the bottle capped and the mixture heated at about 50° C. for about 16 hours. Thereafter 0.5 gram of the photoinitiator employed in Example 1 was stirred in and the solution was applied to release paper, cured and tested using a procedure similar to that described in Example 1. The cured film had a tensile strength of 2500 psi and a ultimate elongation of 80 percent. The tensile strength was 4.90 times greater than the tensile strength of the known comparable radiation-curable coating of Experiment B.

EXAMPLE 4

There were charged to the three neck flask described in Example 1, 53 grams of diethylene glycol, 96.3 grams of diphenyl carbonate and 0.1 gram of sodium hydroxide. The mixture was reacted following the procedure described in Example 1. A distillate of 83.3 grams of phenol and a residue of 63.9 grams of a polymeric carbonate diol having a number average molecular weight of 1294 were recovered. The polycarbonate diol had the general structure shown in Example 2.

To an amber bottle there were charged 20 grams of the above polymeric polycarbonate diol, 2 drops of dibutyl tin dilaurate as catalyst, 13.1 grams of 2-(N-methylcarbamoyloxy)ethyl acrylate, 6.9 grams of isophorone diisocyanate and 3.6 grams of 2-hydroxyethyl acrylate. The reactants were mixed, the bottle capped and the mixture heated at about 50° C. for about 16 hours. Thereafter, 0.5 gram of the photoinitiator employed in Example 1 was mixed in and the solution was applied to release paper, cured and tested using a procedure similar to that used in Example 1. The cured film had a tensile strength of 3300 psi and an ultimate elongation of 94 percent. The tensile strength was 6.47 times greater than the tensile strength of the known comparable radiation-curable coating of Experiment B.

What is claimed is:

1. Acrylated urethane polycarbonates having the general structural formula:

wherein O is oxygen and C is carbon; X is acryloyloxy; R is alkylene of from 1 to 20 carbon atoms; Q is the residue of an organic polyisocyanate after it has reacted with the reactive hydroxyl groups of the other reactants and the isocyanato groups have been converted to urethane linkages, R' is the residue of an alkylene diol or polyoxyalkylene diol having 2 to 10 carbon atoms in the alkylene group and a molecular weight of from 28 to 230; y is the number of carbonate groups of the polycarbonate polyol reactant; and the sum of m and n is equal to the total reactive equivalents of the Q groups.

2. An acrylated urethane polycarbonate as claimed in claim 1 wherein said organic polyisocyanate is a diisocyanate.

3. An acrylated urethane polycarbonate as claimed in claim 1 wherein R is ethylene, Q is the residue of isophorone diisocyanate and R' is the residue of 1,4 butanediol.

4. An acrylated urethane polycarbonate as claimed in claim 1 wherein R is ethylene, Q is the residue of isophorone diisocyanate and R' is the residue of diethylene glycol.

* * * * *